United States Patent Office 2,844,569
Patented July 22, 1958

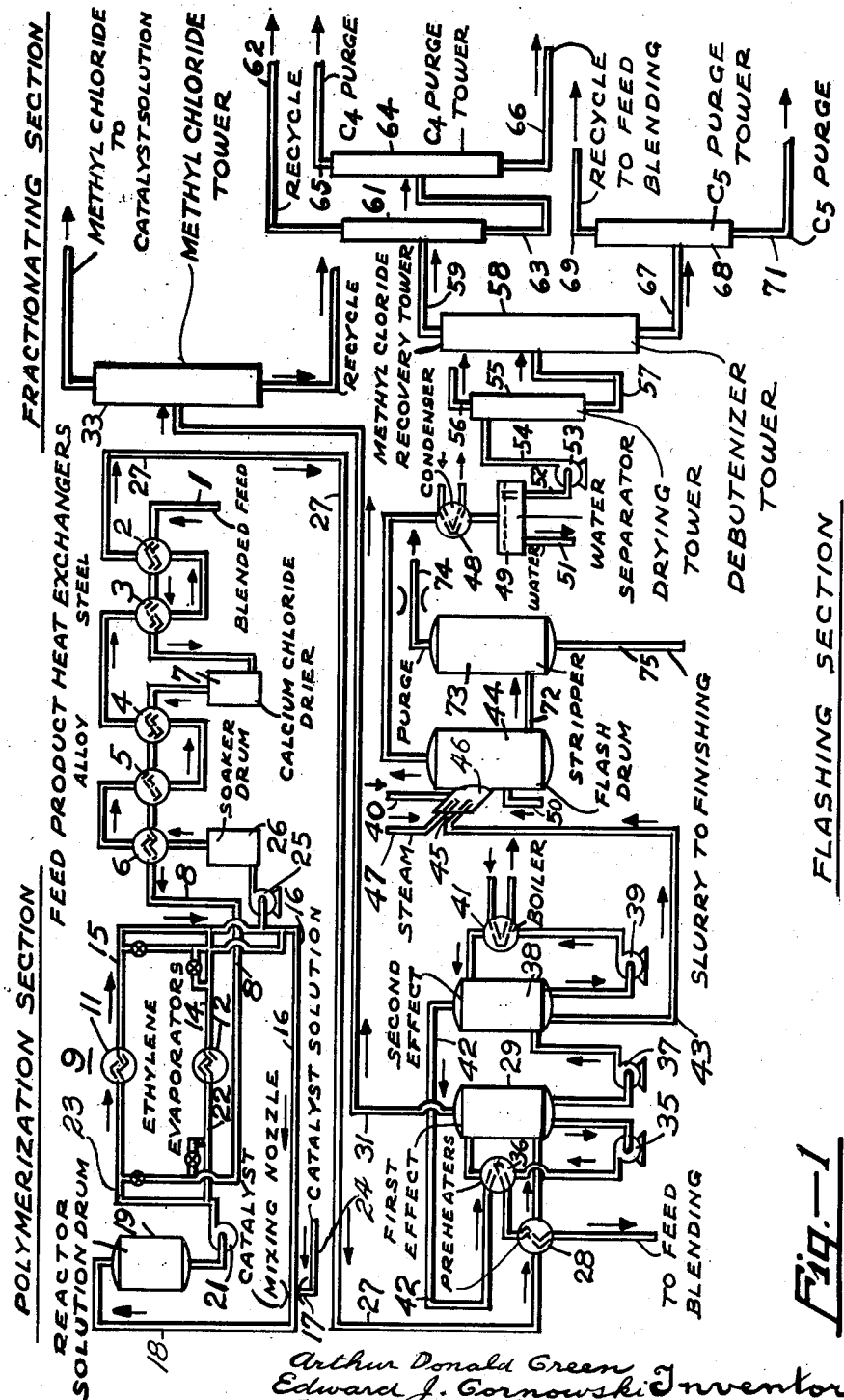

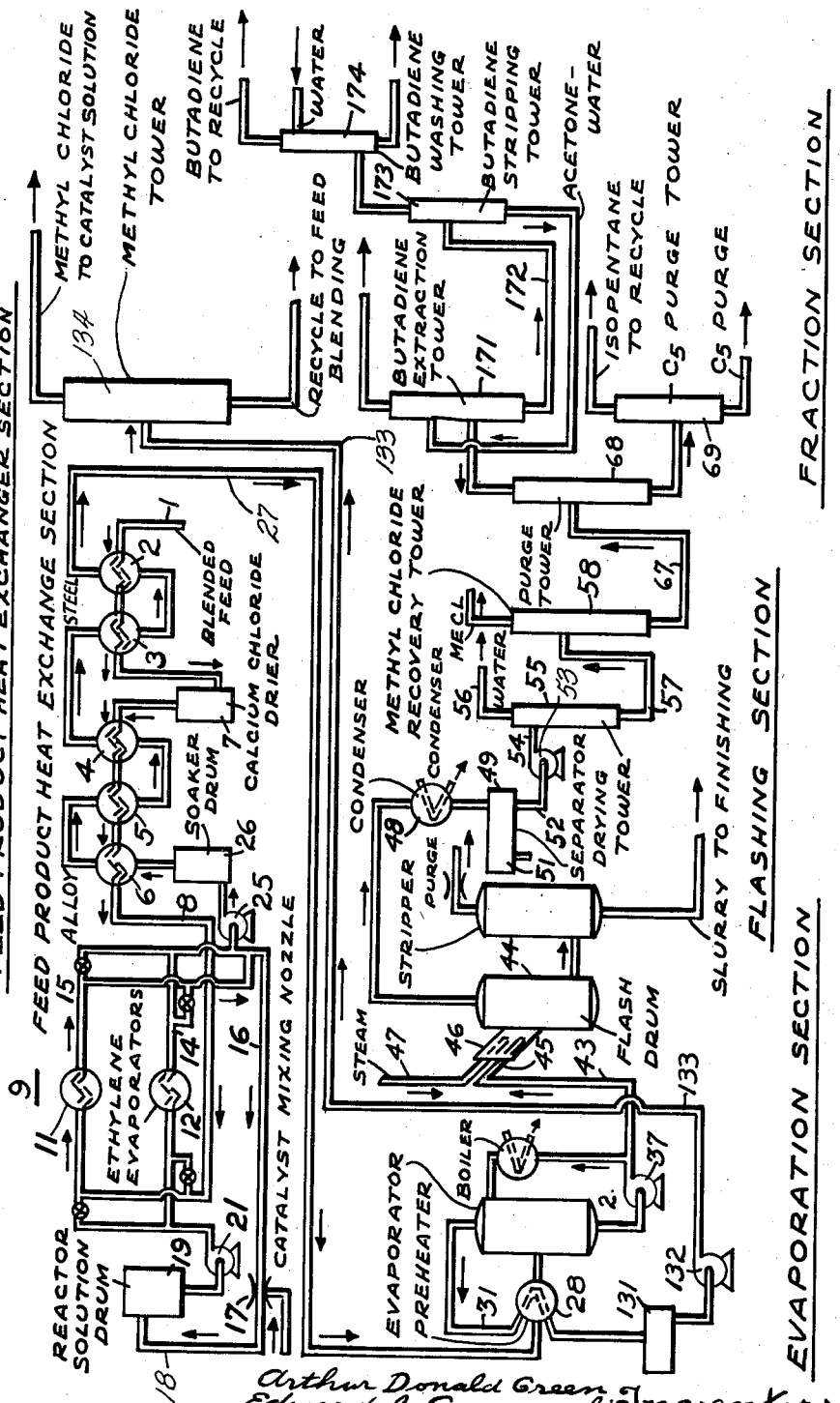

2,844,569

**SOLUTION PROCESS FOR MAKING ISOBUTYL-
ENE-DIOLEFIN SYNTHETIC RUBBER**

Arthur Donald Green, Westfield, Edward J. Gornowski, Cranford, Harold W. Scheeline, Elizabeth, and Stanley E. Jaros, Plainfield, N. J., assignors to Esso Research and Engineering Company, a corporation of Delaware Application November 5, 1954, Serial No. 466,976

19 Claims. (Cl. 260—85.3)

This invention relates to apparatus and process for the low temperature polymerization of olefinic substances; relates particularly to polymerization processes utilizing a solvent for the olefinic monomers which is also a solvent for the polymer; and relates particularly to apparatus and processes utilizing a solvent together with heat exchangers and flow-steps for the recovery of refrigeration in the solution of finished polymer to cool the solution of unpolymerized monomers for subsequent polymerization. This application is a continuation-in-part of application Serial No. 125,422, filed November 4, 1949, and now abandoned, entitled "Improved Solution Process for Making Isobutylene-Diolefin Synthetic Rubber," inventors Arthur D. Green, Edward J. Gornowski, Harold W. Scheeline, and Stanley E. Jaros.

As is well shown in U. S. Patents Nos. 2,356,127, 2,356,128, and 2,356,129, a very valuable elastomeric polymer which is particularly valuable as a replacement for rubber can be produced by the copolymerization of isobutylene and a multiolefin at reduced temperatures, by the application to the olefinic material mixture of a Friedel-Crafts catalyst, and a semi-continuous process has been developed by means of which very large quantities of commercial polymer have been produced. This procedure utilizes a diluent which is mixable with the olefinic monomers, but which is a non-solvent for the polymer. This process produces a slurry of polymer in diluent at low temperature which is discharged into warm water to volatilize out the diluent and unreacted monomers, and produces a slurry of polymer in water from which the polymer is recovered by a straining and drying operation. This process has proved to be commercially feasible, but it is undesirably expensive because of the loss of refrigeration in the relatively large amount of cold diluent and unreacted olefinic monomers discharged into the warm flash tank.

In this process it is essential, in order to remove the polymer from the reactor, that the solid polymer be retained in slurry form during the polymerization. However, the polymer is strongly solvated by any hydrocarbons present in the reactant mixture and to insure the maintenance of the polymer in the form of slurried particles, and to prevent coalescence it is necessary, both to operate the reaction at a very low polymerization temperature to reduce the effect of the solvation, and it is also necessary to maintain the lowest possible monomer concentration as distinguished from polymer content in the reactant mixture as possible, in order to avoid the formation of large masses of coherent polymer which interrupt the circulation, and are too large to be discharged through the overflow.

Also, the molecular weight of the polymer produced is a function, both of the lowness of the temperature, the purity of the reactants, and the concentration of monomers present.

Accordingly, by the use of good purity reactants and a relatively high concentration of reactants, satisfactory molecular weight can be obtained at temperatures as high as —50° C. to —40° C. or even higher, but in the prior process, since the monomer concentration must be kept low to prevent coalescence and destruction of the slurry, the temperature must also be kept very low in order to obtain the desired molecular weight. Accordingly, in order to maintain reasonable periods of operation, it has been found necessary to utilize polymerization temperatures ranging from —85° C. to —103° C., and a monomer concentration in the reactant mixture well below 10%.

The amount of refrigeration required for such operation is very expensive, and none of it can be recovered, since the slurry must be discharged immediately into warm water in order to convert the slurry of polymer in diluent, and unsaturates into a slurry in water.

In addition, the process is not truly continuous, since some polymer is deposited in solid form on the interior walls of the reactor, where it interferes with transfer of heat to the refrigerating jacket, and must be cleaned off periodically at intervals ranging from 20 to 150 hours, which cleaning procedure involves a shut-down of the reactors, the use of large quantities of solvent, warming up to room temperature, and a difficult reactor restarting problem which tends to produce off-grade polymer.

It has been suggested that the copolymer can be prepared from monomers dissolved in a material which is a solvent for both the monomer and the finished polymer, but such operation, when carried out along conventional lines, is unsatisfactory, because of the exceedingly high viscosity of polymer solutions, especially at low temperatures; that is, copolymer having a Staudinger molecular weight number between 35,000 and 60,000, which is the desirable range, if dissolved in carbon disulfide to the extent of 10%, is, at the polymerization temperature, too viscous to be pumped, and flows so very slowly as to be almost impossible to handle, and only when the concentration is held below 4% or 5% can the cold solution be handled in pipes and pumps. Accordingly, the previous continuous processes become even less efficient if the polymer is produced in solution, because of the limitation on the polymer concentration, since the cold solution to be handled, must be kept below 3%, 4% or 5%, whereas a cold slurry has a low viscosity and can be handled at concentrations as high as 15%, 20% or even 25%.

Also, such high viscosity values cause a very low rate of heat transfer and also poor and difficult catalyst dispersion. According to the present invention, it is now found that a solution of the desired olefin monomers in almost any desired proportion can be prepared in a low boiling hydrocarbon, a light naphtha, with a boiling point preferably in the general neighborhood of room temperature, particularly suitable solvents being propane with a boiling point at or near —40° C. or commercial butane with a boiling point at or near —6° C. or pentane with a boiling point just a little above room temperature, or commercial hexane with a boiling point at or near +69° C. While the solvents mentioned are entirely satisfactory in certain operations, it may be desirable to maintain a single homogeneous phase during the heat exchange stages. While a solvent such as butane will result in a single homogeneous phase at temperatures below about —15° F. at polymer concentrations of about 5%, two liquid phases will result in temperatures higher than about —15° F. Thus, if butane is utilized as the solvent two liquid phases will be secured when the butane polymer solution is raised in heat exchange to about 80° F. in contact with the incoming feed. Thus, if it is desirable to maintain a single homogeneous liquid phase the preferred solvents are commercial hexane or heptane or a mixture of these. This mixture of olefins and solvent may be prepared in whatever concentration is most advantageous from the point of view of obtainable m lecular weight in terms of the purity of reactants and desirable temperature. This material is then further treated by cooling it (as by countercurrent flow) in a tubular heat exchanger, adding a catalyst solution when the temperature has reached the desired low value, preferably in a second heat exchanger having a refrigerant jacket such as boiling liquid ethylene as the cooling medium.

Alternatively, liquid ethane or liquid carbon dioxide or liquid sulfur dioxide or other convenient refrigerant may be used in the cooling jacket. The reaction may then be completed in a soaking drum at the desired low temperature, the amount of polymerization being limited by restriction of the catalyst to an extent such that the amount of dissolved solid polymer is low enough to produce a solution which has a low enough viscosity to be readily flowable, and thin enough to avoid interference with heat transfer and catalyst dispersion. This low concentration solution of polymer in solvent and unpolymerized monomers is then used as cooling medium for incoming monomer solution, bringing the temperature of the product solution to the boiling point of the solvent (at which temperature the viscosity is greatly reduced), boiling off a major proportion of the solvent and unpolymerized monomers under anhydrous conditions to permit either of direct condensation and re-use after the addition of more olefinic monomer as polymerization material, or the boiled off material may be fractionated and remixed for recycling; the residue of dissolved solid polymer at solution concentrations of from 10% to 35%, at a relatively elevated temperature, being then discharged into hot water via a special atomizing nozzle or other suitable special means for producing water slurries from solutions for volatilization of the remaining diluent and any residual traces of monomer, and the production of a slurry of polymer in water which can be strained, the polymer dried and further processed as in the prior art.

Thus, the system of the invention provides a mixing and blending mechanism in which isobutylene of adequate purity is mixed (in major proportion if desired) with a minor proportion, if desired, of a multiolefin having from 4 to 14, inclusive, carbon atoms per molecule, and from 3 to 25 volumes of light naphtha having a boiling point within the range between −40° C. and +69° C. to produce the raw material as "feed" for the reaction.

The blending mechanism is connected to a series of heat exchangers in which the blended feed is cooled to a temperature close to polymerization temperature by countercurrent flow with a cold solution of finished polymer. The heat interchangers are then connected in turn to another heat interchanger cooled by boiling liquid ethylene. Two duplicate coolers are provided, which serve alternately, one as cooler for the incoming feed, the other as cooler for circulating partially polymerized material. These two heat interchangers are provided with valve systems which permit interchanging their respective functions so that one serves to cool the partially polymerized circulating mixture until it is fouled by adherent polymer, while the other is being washed free from adherent polymer, and simultaneously cools the incoming feed.

The ethylene jacketed cooling exchanger which serves to cool the circulating, partly polymerized material, is connected to a mixing nozzle which is also connected to a dissolver for preparing the catalyst solution. The mixing nozzle then is connected to a reaction drum which is equipped with a circulating pump connected in turn to the ethylene jacketed heat exchanger. An ethylene cooled circuit is thus provided, including the ethylene jacketed cooler, mixing nozzle, reactor drum and circulating pump. An overflow means from this circuit is then provided, with a transfer pump leading to a second reactor drum in which the last trace of catalyst activity occurs. This drum thus contains a dilute solution of finished polymer. The second drum is connected to the countercurrent heat exchangers in which the entering feed is cooled as much as possible, while the product solution is heated as much as possible. The outgoing polymer solution is then led to a series of evaporators in which a large portion of the diluent-solvent and substantially all of the unreacted monomers are boiled off. A fractionating system and a condensing system operating under elevated pressures are also appropriately connected to the evaporators for the recovery, separation and condensation of the evaporated material. The evaporators are then connected to a flash drum in which the last traces of volatile hydrocarbon material are driven out from the unevaporated polymer solution, and a slurry of polymer in water produced.

By this sequence of process steps, and combination of apparatus, a copolymer is produced at a low temperature in dilute solution, whereby a suitable polymer is obtained, with a minimum amount of refrigeration and a minimum of drying and separation of monomers and recycled solvent.

Also, the system and procedure reduces to a minimum the difficulties otherwise encountered from fouling of reactors, thus making it possible to maintain continuous operation over prolonged periods of time at maximum capacity, with a minimum of operations for cleaning and overhauling.

Other objects and details of the invention will be apparent from the following description when read in connection with the accompanying drawing, wherein:

Fig. 1 is a diagrammatic representation of apparatus suitable for polymerization in normal butane solution; and Fig. 2 is a diagrammatic representation of a similar system arranged for polymerization in isopentane solution.

In the process of this invention, the primary raw materials are isobutylene, and a multiolefin having from 4 to about 14 carbon atoms per molecule. There is also required a diluent which may be either propane, one or more of the several isomeric butanes, one or more of the several isomeric pentanes, or one or more of the several isomeric hexanes (or a heptane, or octane if desired, although for most purposes the boiling points of these materials are undesirably high).

It may be noted that the list of substances usable for diluent is relatively small since the substance must be liquid at the polymerization temperature, and must be solvents for the polymer at the polymerization temperature, and in addition must be free from interference with the catalyst or the reaction. This requirement rules out the lower alcohols which react with the catalyst and are not solvents for the polymer. It likewise rules out the ethers, aldehydes and organic acids, all of which are non-solvents for the polymer, and most of which tend to interfere with the catalyst.

The hydrocarbon solvent materials are normally obtained from the fixed gases derived from petroleum cracking operations. The isobutylene is preferably of relatively high purity, as from 96% to 99.5% purity, although the presence of butane, either normal or iso, is immaterial. However, unsaturates such as traces of propylene, butene-1 and butene-2 are preferably kept to as low values as possible. It is highly desirable that such unsaturated impurities be kept below 0.5%, and it is highly desirable that the amount of butene-2 present be kept below 0.1%.

The solvent-diluent may, as above indicated, consist of propane, butane, pentane, or hexane, or occasionally heptane or octane, and it is desirable that this material be as free as possible from interfering unsaturates. The material preferably consists of narrow cut virgin naphtha in order to avoid as much as possible the presence of unsaturates generally. The presence of traces of lower boiling saturates is immaterial, but the presence of heavy ends is undesirable because of the difficulty of getting them out from the polymer during the water slurrying and finishing operation. Since, however, much of the diluent will be recycled, a somewhat careful purifying operation on the recycle stock is usually necessary. Also, it is usually better to avoid mixtures of diluent substances, since the use of mixtures tends to introduce a troublesome separation problem in the handling of recycle material.

The third component of the mixture is a multiolefin having from 4 to 14, inclusive, carbon atoms per molecule such as butadiene, isoprene, dimethyl butadiene, myrcene, dimethallyl, 2-methyl 3-nonyl butadiene 1-3, or 2-methyl 4-pentyl butadiene 1-3, or the like.

For the purposes of this invention, any hydrocarbon unsaturate containing 2 or more units of ethylenic unsaturation, without regard to the configuration may be used as the third component.

These raw materials are preferably mixed in appropriate blending equipment. The isobutylene usually is delivered as a liquid at atmospheric temperature under pressures of about 40 lbs. per square inch (depending upon the actual ambient temperature), the solvent-diluent likewise may be delivered as a liquid at room temperature under similar nominal pressures, depending upon the diluent chosen; pentane and hexane being liquid at room temperature and atmospheric pressure. The proportion in which the isobutylene and the multiolefin are mixed depends upon the particular copolymer to be made. If the copolymer is to have an iodine number (by the Wije method) below about 50, and isoprene or a higher multiolefin is to be used, the isobutylene will be present in major proportion and the multiolefin in minor proportion. That is, if isoprene is used with the isobutylene is a mixture containing from 1 to about 7% by volume, the copolymer will contain from about 0.3 to about 5 molecular percent of copolymerized isoprene.

With butadiene approximately 30% by weight is required in the feed mixture to produce a copolymer containing 3 to 5 molecular percent of butadiene. This procedure, however, is very easy with the present process, since the presence of excess, unpolymerized monomers does not matter and by simple adjustment of the feed, a suitable proportion of butadiene is readily obtained without interference to the polymerization reaction, as is otherwise unavoidable in the processes of the prior art.

With cyclopentadiene the copolymerization ratio is considerably higher, so much so that cyclopentadiene tends to copolymerize in a proportion greater than that present in the mixture. In this instance also, by adjustment of the proportion of isobutylene present, the desired amount is readily copolymerized into the mixture.

The polymerization is caused to occur by the use of a Friedel-Crafts active metal halide catalyst in liquid form. The preferred catalyst material is a solution of aluminum chloride in methyl chloride and this catalyst is operative with mixtures containing any or all of the above-outlined multi-unsaturates. Nearly as satisfactory is a solution of boron trifluoride in methyl chloride, or in a low-boiling hydrocarbon which conveniently may, if desired, be the same hydrocarbon which is used for solvent diluent.

Alternatively also, aluminum bromide in solution in a convenient hydrocarbon which may be the same as the diluent, may likewise be used, and aluminum bromide shows a satisfactory solubility, not only in methyl or ethyl chloride, but in the lower boiling hydrocarbons. In many operations it is desirable to carry out the operation with an all-hydrocarbon system and to eliminate the use of materials such as methyl or ethyl chloride. Under these conditions it is very desirable to employ as the catalyst aluminum bromide.

Thus, for the catalyst, there is preferably used a Friedel-Crafts active metal halide catalyst in solution in a low freezing non-complex forming solvent. For the active metal halide, any of the materials shown by N. O. Calloway, in his article on the "Friedel-Crafts synthesis," printed in the issue of Chemical Reviews, published for the American Chemical Society at Baltimore in 1935, volume XVII, No. 3, the article beginning on page 327, the list being particularly well shown on page 375, may be used.

For the solvent, to be low freezing, it is merely necessary that the freezing point be below 0° C., and it is not necessary that the freezing point be below the polymerization temperature, since the catalyst solution may be added in liquid form at a temperature above the polymerization temperature and it dissolves in the polymerization mixture before any sign of congealing or freezing out occurs.

To be non-complex forming, it is merely necessary that instillation to, or distillation from the solute of the solvent shall result in minor or negligible change in boiling point of the solution from the boiling point of the pure solvent, and that a smooth change in boiling temperature shall occur as the concentration changes, and in general that the solute can be recovered unchanged merely by evaporation of the solvent.

The feed mixture of monoolefin, multiolefin and solvent-diluent may be prepared in any convenient manner at any convenient temperature and the catalyst solution likewise may be prepared in the usual apparatus at a convenient temperature. These steps need not differ from the steps of the prior art, since they provide merely the raw materials for the polymerization reaction.

Referring to the figures, particularly Fig. 1 (which shows a first embodiment for the production of a copolymer of isobutylene with isoprene, utilizing normal butane as solvent diluent), the feed mixture of isobutylene, multiolefin and solvent-diluent is then supplied through a pipe line 1 to a series of heat interchangers 2, 3, 4, 5, and 6 (a series of exchangers is shown for maximum of cooling efficiency; one exchanger could be used). Since it is extremely desirable that the feed mixture contain the lowest possible amount of moisture, it is frequently desirable that the mixed feed, after partial cooling, be passed through a calcium chloride dryer 7. This, while highly desirable, is however not an essential portion of the invention (since the feeds and recycle streams are previously well dried by distillation).

From the heat interchange coolers 2, 3, 4, 5, and 6, the blended feed mixture is conveyed through a pipe line 8 to a circulating polymerization system 9. This system desirably consists of at least two ethylene-cooled chillers 11 and 12, one of which is connected by suitable piping to a position between the primary coolers and the circulating system, while the other is connected through pipes 14, 15 and 16 to a nozzle device 17, which in turn is connected through a pipe line 18 to a reactor drum 19. The reactor drum 19 in turn is connected to a circulating pump 21 which is connected through pipes 22 and 23 to the ethylene chillers 11 and 12. The catalyst nozzle 17, likewise is connected through a pipe line 24 to the supply of catalyst solution. Appropriate pressuring or pumping means are provided between the storage tanks for the blended feed and the pipe 1 and the catalyst storage tank and the pipe 24 to insure a proper flow of raw material and catalyst to the polymerizer system 9, as above pointed out, the piping is so arranged that either of the chillers 11 and 12 may be connected between the circulating system, and the primary coolers, while the other is connected in the circulating system 9.

It may be noted that two ethylene coolers 11 and 12 are provided. These are connected in parallel with valve controls to permit the use of either one for cooling the circulating mixture, and the other for final cooling of incoming feed. It may be noted that there tends to be some fouling of surfaces in the system, in spite of polymerization in solution. This is immaterial in the reaction drum 19, since a layer of adherent polymer merely improves the heat insulation of the drum. It is undesirable, however, in the circulating cooler. However, the fresh cold feed of isobutylene, multiolefin, and solvent has a strong dissolving action on any adherent polymer, and accordingly, by passing the cold fresh feed through one cooler in the absence of catalyst, any fouling polymer is readily removed, then when the other cooler has picked up a significant amount of fouling layer, the position of the two are reversed, the clean cooler being used for cooling the circulating polymer solution, and the fouled cooler being used for the final cooling of the fresh feed and simultaneous cleaning from adherent polymer.

A pump member 25 is likewise connected to the circulating system 9, preferably to the pipe line 16. The pump 25 serves to provide the necessary pressure for discharge of polymerized solution from the circulating system 9 to the second side of the heat exchangers 6, 5, 4, 3, and 2. To the discharge outlet of the pump 25 there is connected a drum 26 which provides storage for the dilute polymer solution and permits of completion of the polymerization reaction. The dilute polymer solution is then led through the heat exchangers in reverse flow to the direction of flow of the fresh feed. By this procedure, the fresh feed enters the circulating system 9 at a temperature very close to the polymerization temperature, different in fact only by the amount of temperature gradient through the metal of the heat exchange surfaces, and the dilute polymer solution leaves the last heat exchanger 2 at nearly the temperature of the incoming feed, again different by substantially only the amount of temperature gradient through the metal heat exchange surfaces.

From the last heat exchanger 2 the dilute warm polymer solution, under pressure sufficient to maintain liquid condition, is led through a pipe line 27 and through preheater 28 in which the temperature is raised still higher, preferably to or above the boiling point under the applied pressure. From this preheater 28, the dilute polymer solution is conducted to a disengaging drum 29, in which a very substantial portion of diluent and residual unpolymerized unsaturates are vaporized and discharged through a pipe line 31 to a fractionating system 32 consisting of a bubbler-plate column still 33. This still serves to recover a major portion of the methyl chloride catalyst solvent when such is used, for the preparation of further quantities of catalyst solution.

The residue or bottoms from the column 33, consisting mainly of hydrocarbon solvent-diluent and unsaturates is then conducted to storage where it can be fortified with additional quantities of isobutylene and multiolefin and returned as blended feed to the pipe line 1.

Vaporization of solvent and rapid disengagement of volatiles in the drum 29 is effected by a circulating pump 35 which draws warm polymer solution from the bottom of the drum 29 and delivers it through a boiler 36 to the top of the drum 29 where a substantial portion evaporates and the remainder drains to the bottom of the drum. A pump 37 is connected to the bottom of the drum 29 to withdraw a substantial portion of the warm solution and deliver it to a second disengaging drum 38. The drum 38 is provided with a circulating pump 39 and a boiler or heat exchanger 41, preferably heated by steam. It may be noted that most of the heat of vaporization is provided by steam in the boiler 41, which heats a circulating stream of polymer, disengaging most of the vapor which is to be disengaged. The major portion of the evaporation effect thus is obtained in the boiler 38. This second drum, heater and circulating pump completes the concentration of the polymer solution to the thickest flowable consistency. The disengaged hot vapors from the drum 38 are sent back through a pipe line 42 to the heaters 36 and 28. The thick residual solution from the drum 38 is discharged through a pipe line 43 which leads to a flash drum 44. The thick warm polymer solution from the pipe 43 is delivered through a nozzle 45 into a receiving pipe 46, into which there is also entered a steam line 47, both being connected to the drum 44. The steam line 47 is connected to a steam jet within the member 46 which serves to break up, atomize and heat still further the stream of concentrated polymer, and reduce the partial pressure of the solvent vapor by the dilution effect.

This nozzle desirably is made as shown in U. S. application Serial No. 780,210, now Patent No. 2,607,763, there being provided a jet for the introduction of a stream of polymer which is intermingled with a jet of steam under considerable pressure. The jet of polymer may be delivered into a concentric jet of steam, or the polymer may be delivered through a series of circularly positioned jets, surrounded by a series of tangential jets of steam to yield the maximum turbulence and temperature in the jet structure. This system vaporizes substantially all of the volatile material from the polymer solution, and converts the polymer into particles which are wetted and carried along by the turbulent current of steam and water circulated to 46.

It may be noted that the stream of hot polymer solution is quite viscous, and in order to obtain a satisfactory, flowable slurry, free from chunks, the stream of polymer solution must be broken up into relatively small drops at a temperature sufficiently high to disengage most of the remaining volatiles, and these particles must be delivered into the warm water in the tank 44 before there is an opportunity for them to coalesce. Accordingly, the steam jet through the pipe 47 must be supplemented by a water jet through the pipe 40, preferably delivered in the form of tangential jets of water. This water preferably is obtained from the drum 44, being recirculated by a pump (not shown). Thus the water delivered through the pipes 40 or 50, or both, may be fresh water or may be a circulated stream of warm water and slurried polymer.

The drum 44 is about half filled with a slurry of polymer in water. It receives the freshly formed slurry from pipe 46. Drum 44 also serves to disengage vapors of solvent and unpolymerized unsaturates from the water and polymer. The vaporized material from the flash drum 44 is delivered to a condenser 48 to condense the residual diluent and residual monomers. The pressure in drum 44 is maintained sufficiently high to permit condensation of this stream with cooling water.

It may be noted that most of the process steps here disclosed may be conducted under considerable pressures. In the first heat interchangers, the final coolers and the polymerizing system, the pressures may be any convenient value, since the necessary low temperatures for satisfactory polymerization bring the boiling points below those at atmospheric pressure. However, in the several heaters to which the polymer solution is delivered by line 27, substantial pressures are desirable. These pressures may be produced by the pump 25, and may be such that the vapors disengaged in the tank 29 may leave the tank under sufficiently high pressure to insure condensation in the column 33 at convenient temperatures, which may be close to room temperature, or to available cooling water temperatures. In consequence, the distilled methyl chloride may be readily condensed to a liquid for the making of catalyst solution, and the recycle material may leave as a liquid, ready for whatever further processing is necessary. Similarly, the second stream of recycle material taken from the heat exchanger 28 may likewise be under sufficient pressure to be a liquid at some convenient temperature which also may be near to room temperature, or cooling water temperature.

Also, by the maintenance of moderately elevated pressures, the vapor discharged from the top of the flash drum 44 may be under such pressure that cooling water in the heat exchanger 48 will condense substantially all of the vapors, permitting ready separation of water under pressure through the pipe 61, and liquid hydrocarbon material through the pipe 52 to the separating tower 55. By the use of these pressures, it becomes possible to avoid the use of compressors for compressing and liquefying gas of any sort, and all of the pressures are readily obtained merely by the pumping of liquids, and in addition, a minimum amount of refrigeration is required, thereby greatly reducing the amount of refrigerant to be compressed and cooled.

It may be noted that if a hydrocarbon solvent-diluent is used, having a boiling point substantially above the boiling points of the catalyst solvent and isobutylene, these two latter components practically all are evaporated in the drums 29 and 38, and recovered for recycle under anhydrous conditions in the fractionating tower system 32, and practically only the solvent-diluent and multi-olefin are volatilized in the drum 44. Under these circumstances, only a moderate cooling is needed in the condenser 48, and a mixture of water and solvent leaves the condenser 48, and enters the collecting tank 49. In this tank the water settles to the bottom and is drained out through a drain pipe 51, and the solvent is drawn off from the upper layer through a pipe 52, conducted to a pump 53 and thence delivered through a pipe 54 to a fractionating column 55.

In the tower 55 traces of water dissolved in the solvent are removed by distillation and discarded overhead through the pipe 56. The bottoms from the tower 55 then consists of primarily $C_4$ and $C_5$ hydrocarbons, substantially free from moisture. The bottoms are delivered through a pipe 57 to a second fractionating tower 58 in which all of the butenes and a little n-butane are taken overhead through a pipe 59 to the methyl chloride recovery tower 61, from which the overhead consists of methyl chloride not evaporated in drums 29 and 38 and some $C_4$ material, which is returned to the feed-blending tank for recycle to the pipe 1. The bottoms from the tower 61 are taken through a pipe 63 to another tower 64, the overhead from which is a $C_4$ stream rich in butene 1, a reaction poison, which is purged through a discharge pipe 65, and the bottoms, consisting of relatively pure butane and isobutylene, are discharged through a pipe 66 to the feed mixing system for recycle. The bottoms from the fractionating tower 58, containing substantially all of the isoprene and the bulk of the n-butane fed to tower 58, are led through a pipe 67 to a fractionating tower 68, where high boiling impurities are purged as bottoms through a pipe 71 and discarded while the purified isoprene and n-butane is taken off overhead through pipe 69 to the feed blending tank for recycle to pipe 1.

The steam jet in the structure 46 which drives off the last of the volatiles from the polymer also wets the polymer, and breaks it up into relatively small particles, which are slurried in the drum 44. These particles are significantly lighter than water, and tend to "cream" on the water. However, a very vigorous stirring and circulation is maintained in the drum 44 by a stirrer (not shown) to maintain a practically uniform slurry of polymer in water. This slurry of polymer in water is delivered through a pipe 72 to a second drum 73, in which further traces of unsaturates are disengaged and discharged through a take-off pipe 74. Drum 73, likewise, is equipped with an efficient stirrer to maintain the slurry, and a steady stream of slurry in water is taken through pipe 75 to the finishing system. This system is not shown, since it is merely the standard finishing system of the prior art, consisting of a strainer, which may be a rotary vacuum type filter, or may be a vibrating screen separator, or other type of strainer, or filter as desired. It may be noted that a filter press, while usable, is less efficient, because of the necessity for opening and closing the press, and it is preferable that a continuous filter be used. The loose, moist, solid polymer is then discharged to a convenient dryer, preferably by way of a conveyor belt. The dryer may take the form of any convenient drying system, but preferably is a link belt type of hot air tunnel dryer, in which the belt is treated with an anti-tack agent, such as a fine spray of castor oil, the polymer dropped onto the belt at the entrance end, and conveyed through the hot air tunnel dryer to the exit end. The necessary temperature for effective drying is close to the softening temperature of the polymer, and accordingly, the material at the exit end tends to be more or less adherent and coalesced. The emerging sheet of "sintered" solid polymer may then be cut into strips across the length of the sheet, dropped onto a conveyor and carried to an extruder where the necessary working brings the polymer to a temperature well above the boiling point of water, and into a plastic condition, where the last traces of water are readily removed.

Standard practice delivers the polymer from the strainer with from 20% to 80% of moisture. The tunnel drying oven reduces this amount of moisture below 1% in the emerging sheet of polymer. In some instances the water content may be less than 0.1%, and sufficiently low for subsequent processing needs. However, such low values are obtainable only under advantageous conditions, and it is usually desirable to use the extruder in addition, which brings the water content below 0.5%, which is satisfactory for all known commercial uses. From the extruder, the polymer is delivered via a belt conveyor to a double roll mill on which a rolling bank of polymer is formed, from which a strip of practically water and air-free polymer is taken. This strip may be carried over a cooling belt, cut into squares and packaged in appropriate cartons, which are preferably coated on the inside with anti-tack agent to prevent difficulty in unpacking the material from the package preparatory to milling, compounding and fabrication into the desired finished structure.

In the operation of this embodiment of the system, the raw feed is prepared as above described, preferably consisting of approximately 95 to 98% of isobutylene with from 2 to 5% of isoprene. This mixture is then diluted with the solvent-diluent preferably consisting of butane, free from unsaturates, as received from the plant purifying system. As above pointed out, it is immaterial whether this material is normal or isobutane, but it is desirable that it contain the smallest possible quantity of butene-1 or butene-2.

Simultaneously, the catalyst solution is prepared, preferably consisting of aluminum chloride in solution in methyl chloride in a concentration of approximately 0.1 to 2.0% (although in some instances, still higher concentrations, up to saturation, may be used). In starting operation, of course, there is no cold feed in the heat exchangers 3, 4, 5 and 6, and the feed must be passed along to the ethylene coolers 11 and 12, in which the entire cooling load is temporarily carried.

When the circulating system 9 is filled with feed and the temperature brought down to the desired point, which is preferably between $-95°$ C. and $-103°$ C., the flow of catalyst through the pipe 24 and the mixing nozzle 17 is started. Polymerization begins as soon as the catalyst concentration reaches the critical minimum or threshold value, and an overflow of cold polymer solution takes place through the pump 25, the drum 26 and the heat exchangers 6, 5, 4, 3, and 2. This countercurrent cooling of the incoming feed by the outgoing polymer solution effects a very great saving in refrigeration; between 45% and 55% of the refrigeration otherwise needed being saved; the refrigeration needed being only sufficient to take care of the heat of reaction in the circulating reaction system 9 (and the usual heat leakage losses).

As above indicated, the preferred polymerization temperature is that obtained by liquid ethylene, since it permits of the use of isobutylene which has not been highly purified. However, if a little higher purity of isobutylene and isoprene are used, or a little higher monomer concentration is used, liquid ethane may be used for the final refrigerant, yielding a temperature within the range between $-88°$ C. and about $-80°$ C. With still higher purity reactants, or higher concentration, liquid carbon dioxide may be used, yielding a temperature somewhat about $-78°$ to about $-680°$ C., and, if maximum purity materials and maximum concentration are used, a satisfactory polymer can be made with liquid propane as a refrigerant, operating at temperatures between about −40° C. and about −35° C.

It may be noted that most of the polymerization reaction occurs in the drum 19, and occurs under conditions where there is ample solvent to maintain solution of the polymer as formed. Nonetheless, in some instances, small quantities of polymer adhere to the inside of the drum 19. This, however, is immaterial, since there is no heat exchange through the walls of the drum 19, and the coating of polymer will not interfere with the process and can be removed at infrequent intervals.

It may be noted also that the amount of catalyst solution required for the copolymerization of a given amount of mixed olefins varies very greatly with the purity and physical condition of the feed and catalyst solvent, and may range from as much as one pound of aluminum chloride per 300 pounds of copolymer produced to one pound of aluminum chloride per 2500 pounds of polymer produced. The reason for this variation is still not definitely known, but it is suspected that it is due to the presence of trace-impurities, such as HCl, moisture, and many other substances which may be present in small amounts, in spite of the most careful purifying treatment of the components of the blended feed and catalyst solvent. As above pointed out, the polymer solution leaves the last heat exchanger at a temperature close to the temperature of the entering blended feed which may be anywhere between room temperature and the boiling point of the mixed feed.

The dilute polymer solution, warmed up nearly to its boiling point, is then carried through a preheater to a disengaging drum, where a large portion, which may be as much as ¾ to ⅘ of the diluent and unsaturated residual monomers, are boiled out.

It may be noted that this evaporation occurs under anhydrous conditions and that the more volatile catalyst solvent component is selectively vaporized from the first effect of the evaporator so that a pure catalyst solvent can be prepared with a minimum of further purification and no dehydration step is necessary. Furthermore, a large bulk of the $C_4$ material is obtained in anhydrous condition from the second effect and can be recycled to feed blending without further treatment after being condensed in the first effect boiler 36 and preheater 28.

This combination of countercurrent heat exchange and anhydrous concentration under pressure effects a very great saving in the amount of refrigeration required for cooling of the feed and for the purification and fractional separation of the recycle material, and also eliminates the necessity of compressing gases and expensive drying of recycle streams with chemical adsorbents. The purification operations are confined to the vapor stream leaving the flash drum, which is a small proportion of the total stream recycled.

From the final evaporating drum, the fairly concentrated solution, preferably containing at least 15% of polymer, and better containing from 20 to 25% of polymer, is delivered to a steam dispersion jet 46 by which it is converted to a condition substantially free from volatiles, and moistened by condensed steam or water from other sources which maintains the dispersed condition. The jet of steam and circulating water carry the moistened solid polymer particles into a pool of hot water in the flash drum, with most of the solvent and traces of unpolymerized unsaturates removed. The residual solvent from the flash drum is, of course, contaminated with substantial quantities of water vapor from the hot water, and accordingly, it is not directly usable in the recycle system. However, by condensation of the vapor output from the flash drum, a simple separation of most of the water in a settling tank is possible, thereby greatly reducing the difficulty of purification, and the very low tendency of the hydrocarbon to form hydrates permits of a final purification by distillation alone, after which the hydrocarbon material may be fractionated to recover separately the butane, isobutylene and isoprene in pure form, suitable for re-blending and recycling.

In the flash drum 44, the broken up stream of polymer drops into the water in the form of a stable slurry in water which is discharged from the bottom of the flash tank, from which it is conveyed to a slurry stripper for still further removal of volatiles and then delivered under pump pressure through pipes to a strainer as above outlined, which may be an Oliver type filter or may be a vibrating screen filter, or may be a traveling screen filter, or other pattern as desired. This screening step brings the water content down to 50% or below. The screened polymer may then be delivered to a steam-heated tunnel dryer in which the water content may be brought to 1% or below, after which the polymer may be treated on the double roll mill, or in an extruder to bring the water content to values below 0.5%.

By this process and apparatus of the invention, it is possible to polymerize and copolymerize isoolefins and multiolefins at temperatures from 0° C. down to −164° C., preferably within the range between −40° C. or −35° C., and −103° C., by the use of only sufficient refrigeration to absorb the heat of reaction and the amount of heat represented by the specific heat of the polymerizate mixture multiplied by the temperature gradient in the heat exchanger walls, this being a relatively small fraction of the total heat required to cool the material and absorb the heat of reaction.

Thus, the process of the invention mixes together an olefinic material in relatively small volume with a considerably greater volume of solvent which may conveniently be butane, cools the mixture by countercurrent flow through heat exchangers from a cold polymerizate overflow, and delivers the cold mixture to a polymerizer circulating system in which the cold olefin-solvent mixture is further cooled by heat exchangers jacketed with a refrigerant liquid, a catalyst injection means and a reaction drum; the heat exchangers serving alternately as final feed coolers and polymerization mixture coolers, from which system the polymer solution overflow, after passage through the countercurrent heat exchangers is further heated to vaporize out a major portion of the solvent, to leave a hot, more concentrated solution, which is then vigorously mixed with steam and hot water to convert the solution of polymer in solvent, into a slurry of polymer in water from which the polyer is strained and dried, the first evaporated portion of solvent being evaporated under anhydrous conditions so as to be directly usable for recycle, the second portion of solvent evaporated by the steam being condensed, separated from the water, fractionally distilled to remove undesired residues, and acceptable portions then recycled.

The procedure of the invention and the apparatus outlined above is particularly adapted to the use of butane as solvent diluent for the polymerization reaction. As an alternative, a higher boiling solvent such as isopentane may be used, especially when butadiene is the multiolefin. For this purpose a substantially identical heat interchange cooling system may be used as shown in Fig. 2. In this system there is shown the cooled system, consisting of feed input pipe 1, heat interchangers 2, 3, 4, 5 and 6, which may be used with a calcium chloride dryer 7 if desired, discharging through a cold feed pipe 8 to a similar circulating polymerizer system 9, including ethylene coolers 11 and 12, alternately connected by pipes 14 and 15 through a circulating pipe 16 and catalyst injection nozzle 17 to an input pipe 18 and to a polymerizer drum 19 and circulating pump 21 closely similar to the system shown in Fig. 1. As is well shown in Fig. 2, a similar overflow is taken through the pump 25 and drum 26 through the heat exchange members 6, 5, 4, 3 and 2 to the discharge pipe 27 which is led to the preheater 28, boiler 36, and boiler drum 29. A modification may be introduced at this point, the pipeline 31 for volatilized material being led through the preheater 28 and then to a condenser member 131 and pump 132.

With pentane, either iso or normal, as the solvent-diluent, most of the methyl chloride from the catalyst solution, most of the isobutylene and most of the butadiene, when such is used, leave the polymer solution in the drum 29, about ¾ of the diluent also being evaporated. This mixture is discharged through the pipe 133 to the fractionating tower 134, from which the bottoms go directly to recycle feed blending, and overhead is substantially pure methyl chloride suitable for preparation of catalyst solution. From the bottom of drum 29, the thickened polymer solution is delivered by a pump 37 and pipe 43 to a jet 45 positioned within a receiver line 46 connected to a flash tank 44. A steam line 47 is connected to a jet associated with the polymer solution jet 45, and also a tangential jet of water, either fresh or recirculated from the tank 44, as desired, which together break up the polymer solution into relatively fine particles and permits of rapid disengagement of residual volatiles from the solid polymer and at the same time converts the solution into a slurry of polymer in water, which is transferred to a strainer to bring the water content to about 50% and then through a tunnel dryer to bring the water to a lower value preparatory to milling. The residual pentane and unsaturates containing traces of methyl chloride is taken overhead from the drum 44 to a condenser 48. The residual pentane unsaturates, methyl chloride, and the moisture carried over from tank 44 are condensed and delivered to a separator 49, where the water settles to the bottom and is drained away through a drain 51 and the condensed pentane is delivered into a pipe 52 to a pump 53, by which it is discharged through a line 54 to a fractionating tower 55, from which residual traces of water are discharged overhead through a pipe 56 and the bottoms are carried through a pipe 57 to a second tower 58 from which residual methyl chloride is taken overhead and the bottoms are carried through a pipe 67 to a third fractionating tower 68, the bottoms from which are taken to a fourth fractionating tower 169, from which the pentane is taken overhead for recycle and bottoms are sent to waste. The overhead from the third tower 68 is sent to a fifth tower 171. This fifth tower recovers butadiene from the C₄ purge stream by an extractive distillation with acetone. Alternatively, other recovery methods may be used such as extraction with a copper salt solution and the like. From this tower 171 the bottoms are taken through a line 172 to a sixth tower 173, the bottoms from which, consisting of acetone and water, are returned to the tower 171 for reflux and the tops are taken to a butadiene washing tower 174, the overhead of which is a good grade of butadiene which is sent directly to the recycle mixing equipment; the bottoms which consist of water and impurities are sent to waste. The overhead from the tower 171 contains C₄ impurities and is purged.

The differences in Figures 1 and 2 indicate approximately the differences in process steps and in apparatus necessary for adjustment of the system to the use of various types of polymerizate materials and different solvents.

The process and system of the present invention is particularly desirable for some of the more difficult polymerizations. The prior commercially successful polymerization produced a copolymer of isobutylene and isoprene between which the copolymerizability ratio is close to unity and a mixture of 95 to 98 parts of isobutylene with from 5 to 2 parts of isoprene yields a copolymer containing isoprene copolymerized into the copolymer molecule in the proportion of from 1 to 2.5 or 3 molecular percent. This material makes an excellent replacement for rubber, especially for automobile inner-tubes as well as for proofed goods, and many other uses.

It is found that the poisoning effect of isoprene, or impurities introduced with isoprene, upon the reaction is great enough so that when more than about 10, 12 or 15% of isoprene is present, difficulty is encountered in obtaining a sufficiently high molecular weight. In contrast, the poisoning effect of butadiene upon the reaction is much lower, but the copolymerizability ratio is much poorer. Hence, when it is desired to produce polymers containing from 3 to 5 molecular percent of the multiolefin, with butadiene, there must be present from 30% to 75% of butadiene (the remainder being isobutylene), the mixture of unsaturates then being diluted with a substantial portion of diluent. However, when butadiene is used as the multiolefin, the relatively high proportion of butadiene necessarily present gives a solvating effect to the polymer when in methyl chloride slurry, which introduces extreme difficulty in getting the polymer out of the polymerizer, since it coalesces into very large chunks and largely adheres to the polymerizer walls. Accordingly, to the present, it has been commercially unfeasible to operate a continuous polymerizer on butadiene as the multiolefin because of the many and very great manufacturing difficulties. However, the present process overcomes those difficulties and since the polymer remains at all times in solution, no fouling problems are encountered.

By this procedure it thus becomes possible to produce polymers of isobutylene and butadiene in which the copolymerized butadiene may be present in proportions from 10 to 50 molecular percent with the correspondingly increased iodine number up to 175 as is well shown by the copending application of Nelson and Welch, Serial No. 788,640, filed November 28, 1947, now Patent No. 2,607,764 (which is herewith made part of the present application).

Similarly, this procedure overcomes most of the manufacturing difficulties encountered in the preparation of other copolymers of isobutylene with a wide range of multiolefins as above outlined.

Also, the process and apparatus are particularly well adapted to the manufacture of the hard resin prepared from a major proportion of butadiene and a minor proportion of a less easily copolymerizable monoolefin such as with iso-octene, known as "dimer" (prepared by the dimerization of isobutylene) as is particularly well shown in Serial No. 604,350, filed July 17, 1945, now abandoned and Serial No. 610,212, filed August 10, 1945, now Patent No. 2,476,000 (both of which are herewith made parts of the present application).

In general the process and apparatus here disclosed are used for the manufacture of any low temperature polymer which can be made in solution, to avoid fouling of reactor and to avoid loss of refrigeration with the incidental costliness of power and materials.

Thus the process of the invention copolymerizes unsaturates at low temperatures by the application of Friedel-Crafts catalyst thereto at low temperature in the presence of a solvent for the unsaturates and for the completed polymer, utilizing the refrigeration in the cold polymer solution to cool incoming monomer-solvent feed, absorbs the heat of reaction by direct refrigeration in a circulating polymer solution system, utilizing sufficient amounts of solvent during the polymerization to keep the solution viscosity within a flowable range of values at the low temperature, then warming up the solution to conserve refrigeration and reduce viscosity of the solution simultaneously, vaporizing out a major portion of the solvent at elevated temperature, well above polymerization temperature to recover directly, and under anhydrous conditions a recycle stock, relying upon the higher temperature to maintain the viscosity of the concentrated polymer solution within flowable range, then simultaneously steam vaporizing the residual volatiles, and water slurrying the dissolved polymer in solid form in the water for recovery, drying the residual unsaturates by condensation, settling, mechanical separation, finishing the drying by fractional distillation, then fractionally separating the several components of the steam-vaporized volatiles for reblending and recycling.

While there are above disclosed but a limited number of embodiments of the process and apparatus of the invention, it is possible to produce still other embodiments without departing from the inventive concept herein disclosed, and it is therefore desired that only such limitations be imposed upon the appended claims as are stated therein or required by the prior art.

What is claimed is:

1. In a polymerization process for manufacturing an isobutylene-diolefin synthetic rubber, the steps in combination of circulating a cold mixture of polymerizable unsaturated reactants comprising a major proportion of isobutylene and a minor proportion of a multiolefin of 4 to 14 carbon atoms and 3 to 25 volumes, per volume of reactants, of a $C_3$ to $C_8$ saturated hydrocarbon solvent for both the unsaturates and polymer, having a boiling point within the range of $-40°$ C. to $+69°$ C., at a polymerization temperature of about $-40°$ C. to $-103°$ C., adding thereto during circulation sufficient Friedel-Crafts active metal halide polymerization catalyst dissolved in a low-freezing non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold dilute polymer solution, replacing the withdrawn polymer solution by a steady stream of fresh feed of mixed unsaturated reactants and solvent, cooling said fresh feed first by countercurrent heat-exchange with the withdrawn stream of cold dilute polymer solution to cool said feed to a temperature close to polymerization temperature, and to warm the withdrawn cold dilute polymer solution nearly to the temperature of the incoming feed, and finally cooling said feed, prior to feeding it into the circulating polymerization system, to the desired polymerization temperature by heat-exchange with a liquid cooling medium which boils at the desired polymerization temperature heating the withdrawn dilute polymer solution further to the boiling point of the solvent therein and continuing the heating to evaporate a major proportion of said solvent and unreacted reactants till a hot concentrated still-flowable polymer solution of 10–35% polymer is obtained, and finally discharging the hot concentrated polymer solution into hot water to evaporate remaining solvent and reactants and to make a slurry of polymer and water, and recovering and recycling evaporated solvent and reactants as fresh feed.

2. Process according to claim 1, using isoprene as the multiolefin, and butane as solvent.

3. Process according to claim 1, using isoprene as the multiolefin, and an alkane of 6 to 8 carbon atoms as solvent.

4. Process according to claim 1, using butadiene as the multiolefin, and pentane as solvent.

5. Process according to claim 1, using butadiene as multiolefin, and an alkane of 6 to 8 carbon atoms as solvent.

6. In a polymerization process for manufacturing an isobutylene-diolefin synthetic rubber, the steps in combination of circulating a cold mixture of polymerizable unsaturated reactants comprising a major proportion of isobutylene and a minor proportion of a diolefin of 4 to 6 carbon atoms and 3 to 25 volumes, per volume of reactants, of a $C_4$ to $C_7$ saturated hydrocarbon solvent for both the unsaturates and polymer, at a polymerization temperature of about $-95°$ C. to $-103°$ C., adding thereto during circulation sufficient Friedel-Crafts active metal halide polymerization catalyst, dissolved in a low-freezing, non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold, dilute polymer solution, replacing the withdrawn solution by a steady stream of fresh feed of mixed unsaturated reactants and solvent, cooling said fresh feed first by countercurrent heat-exchange, in a series of heat-exchange zones, with the withdrawn stream of cold dilute polymer solution to cool said feed to a temperature close to the desired polymerization temperature, and to warm the withdrawn cold dilute polymer solution nearly to the temperature of the incoming feed, and finally, cooling said feed, prior to feeding it into the circulating polymerization system, to the desired polymerization temperature by heat-exchange with liquid ethylene, in a system of at least two cooling zones connected in parallel with valve controls to permit alternately the use of one for cooling the circulating mixture, while the other is used for final cooling of incoming fresh feed, and periodically reversing these cooling surfaces when the ethylene cooler used for cooling circulating polymerization mixture becomes fouled by deposition of a layer of polymer on the cooling surfaces, heating the withdrawn dilute polymer solution further to the boiling point of the solvent therein and continuing with the heating to evaporate a major proportion of said solvent and unreacted reactants till a hot concentrated still-flowable polymer solution of 15–25% polymer is obtained, and finally discharging the hot concentrated polymer solution into hot water to evaporate remaining solvent and reactants and to make a slurry and water, and recovering and recycling evaporated solvent and reactants as fresh feed.

7. In a polymerization process for manufacturing an isobutylene-diolefin synthetic rubber, the steps in combination of circulating a cold mixture of polymerizable unsaturated reactants comprising a major proportion of isobutylene and a minor proportion of a multiolefin of 4 to 14 carbon atoms and 3 to 25 volumes, per volume of reactants, of a $C_3$ to $C_8$ saturated hydrocarbon solvent for both the unsaturates and polymer, having a boiling point within the range of $-40°$ C. to $+69°$ C., at a polymerization temperature of about $-40°$ C. to $-103°$ C., adding thereto during circulation sufficient Friedel-Crafts active metal halide polymerization catalyst dissolved in a low-freezing non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold dilute polymer solution, replacing the withdrawn polymer solution by a steady stream of fresh feed of mixed unsaturated reactants and solvent, cooling said fresh feed first by countercurrent heat-exchange with the withdrawn stream of cold dilute polymer solution to cool said feed to a temperature close to polymerization temperature, and to warm the withdrawn cold dilute polymer solution nearly to the temperature of the incoming feed, and finally cooling said feed, prior to feeding it into the circulating polymerization system, to the desired polymerization temperature by heat-exchange with a liquid cooling medium which boils at the desired polymerization temperature.

8. Process as defined by claim 7 wherein said polymerization catalyst comprises aluminum bromide.

9. Process as defined by claim 8 wherein said saturated hydrocarbon solvent is selected from the group of saturated hydrocarbon solvents having 6 to 7 carbon atoms in the molecule.

10. Process as defined by claim 8 wherein said low freezing non-complex forming solvent is selected from the class of saturated hydrocarbon solvents having 6 to 7 carbon atoms in the molecule.

11. Process as defined by claim 10 wherein said multiolefin comprises isoprene.

12. Process as defined by claim 11 wherein the concentration of the polymer in the dilute solution is in the range from about 1% to 3%.

13. In a polymerization process for manufacturing an isobutylene-diolefin synthetic rubber having a Staudinger molecular weight of about 35,000 to 60,000, the steps in combination of circulating a cold mixture of polymerizable unsaturated reactants comprising a major proportion of isobutylene and a minor proportion of a diolefin of 4 to 6 carbon atoms and 3 to 25 volumes, per volume of reactants, of a C4 to C7 saturated hydrocarbon solvent for both the unsaturates and polymer, at a polymerization temperature of about $-40°$ C. to $-103°$ C., adding thereto during circulation sufficient Friedel-Crafts active metal halide polymerization catalyst, dissolved in a low-freezing, non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold, dilute polymer solution, replacing the withdrawn solution by a steady stream of fresh feed of mixed unsaturated reactants and solvent, cooling said fresh feed first by countercurrent heat-exchange, in a series of heat-exchange zones, with the withdrawn stream of cold dilute polymer solution to cool said feed to a temperature close to the desired polymerization temperature, and to warm the withdrawn cold dilute polymer solution nearly to the temperature of the incoming feed, and finally, cooling said feed, prior to feeding it into the circulating polymerization system, to the desired polymerization temperature by heat-exchange with refrigerant, in a system of at least two cooling zones connected in parallel with valve controls to permit alternately the use of one for cooling the circulating mixture, while the other is used for final cooling of incoming fresh feed, and periodically reversing these cooling surfaces when the cooler used for cooling circulating polymerization mixture becomes fouled by deposition of a layer of polymer on the cooling surfaces.

14. In a polymerization process for manufacturing an isobutylene-diolefin synthetic rubber having a Staudinger molecular weight of about 35,000 to 60,000, the steps in combination of circulating a cold mixture of polymerizable unsaturated reactants comprising a major proportion of isobutylene and a minor proportion of a diolefin of 4 to 6 carbon atoms and 3 to 25 volumes, per volume of reactants, of a $C_6$ to $C_7$ saturated hydrocarbon solvent for both the unsaturates and polymer, at a polymerization temperature of about $-40°$ C. to $-103°$ C., adding thereto during circulation sufficient Friedel-Crafts active metal halide polymerization catalyst, dissolved in a low-freezing, non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold, dilute polymer solution, replacing the withdrawn solution by a steady stream of fresh feed of mixed unsaturated reactants and solvent, cooling said fresh feed first by countercurrent heat-exchange, in a series of heat-exchange zones, with the withdrawn stream of cold dilute polymer solution to cool said feed to a temperature close to the desired polymerization temperature, and to warm the withdrawn cold dilute polymer solution nearly to the temperature of the incoming feed, and finally, cooling said feed, prior to feeding it into the circulating polymerization system, to the desired polymerization temperature by heat-exchange with refrigerant, in a system of at least two cooling zones connected in parallel with valve controls to permit alternately the use of one for cooling the circulating mixture, while the other is used for final cooling of incoming fresh feed, and periodically reversing these cooling surfaces when the cooler used for cooling circulating polymerization mixture becomes fouled by deposition of a layer of polymer on the cooling surfaces.

15. Process as defined by claim 14 wherein said metal halide polymerization catalyst comprises aluminum bromide.

16. Process as defined by claim 15 wherein said low-freezing non-complex forming solvent is selected from the class of saturated hydrocarbons having 6 to 7 carbon atoms in the molecule.

17. Process as defined by claim 16 wherein the concentration of polymer in the dilute solution is in the range from about 1 to 3%.

18. Process as defined by claim 16 wherein said diolefin comprises isoprene.

19. In a polymerization process for manufacturing an isobutylene-diolefin synthetic rubber having a Staudinger molecular weight of about 35,000 to 60,000, the steps in combination of circulating a cold mixture of polymerizable unsaturated reactants comprising a major proportion of isobutylene and a minor proportion of a diolefin of 4 to 6 carbon atoms and 3 to 25 volumes, per volume of reactants, of a $C_4$ to $C_7$ saturated hydrocarbon solvent for both the unsaturates and polymer, at a polymerization temperature of about $-40°$ C. to $-103°$ C., adding thereto during circulation sufficient Friedel-Crafts active metal halide polymerization catalyst, dissolved in a low-freezing, non-complex forming solvent, to effect substantial polymerization of the reactants but not more than required to produce a pumpable dilute polymer solution of not over 5% concentration having a viscosity within a flowable range and having good heat transfer and catalyst dispersion, withdrawing from the circulating system as a continuing stream a portion of said cold, dilute polymer solution, replacing the withdrawn solution by a steady stream of fresh feed of mixed unsaturated reactants and solvent, cooling said fresh feed first by countercurrent heat-exchange, in a series of heat-exchange zones, with the withdrawn stream of cold dilute polymer solution to cool said feed to a temperature close to the desired polymerization temperature, and to warm the withdrawn cold dilute polymer solution nearly to the temperature of the incoming feed, and finally, cooling said feed, prior to feeding it into the circulating polymerization system, to the desired polymerization temperature by heat-exchange with refrigerant, in a system of at least two cooling zones connected in parallel with valve controls to permit alternately the use of one for cooling the circulating mixture, while the other is used for final cooling of incoming fresh feed, and periodically reversing these cooling surfaces when the ethylene cooler used for cooling circulating polymerization mixture becomes fouled by deposition of a layer of polymer on the cooling surfaces, heating the withdrawn dilute polymer solution further to the boiling point of the solvent therein and continuing with the heating to evaporate a major proportion of said solvent and unreacted reactants till a hot concentrated still-flowable polymer solution of 15–25% polymer is obtained, and finally discharging the hot concentrated polymer solution into hot water to evaporate remaining solvent and reactants and to make a slurry and water, and recovering and recycling evaporated solvent and reactants as fresh feed.

References Cited in the file of this patent
UNITED STATES PATENTS 2,583,420     Garber et al.     Jan. 20, 1952